July 3, 1956
J. A. TOLMAN
2,752,672
PROCESS OF MAKING BUILDING ELEMENTS
Filed Aug. 30, 1951
6 Sheets-Sheet 1
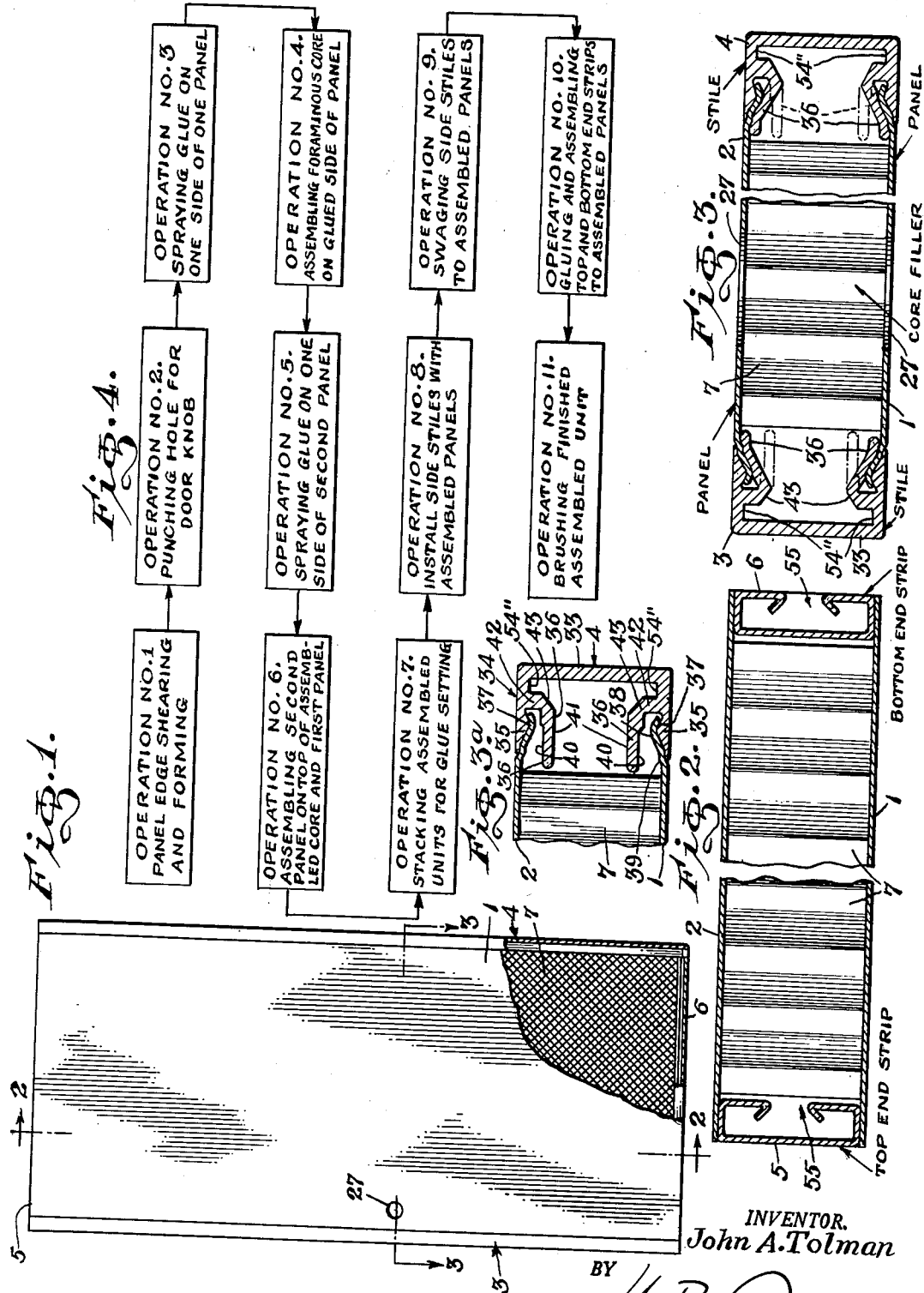
INVENTOR.
John A. Tolman
BY
Attorney.

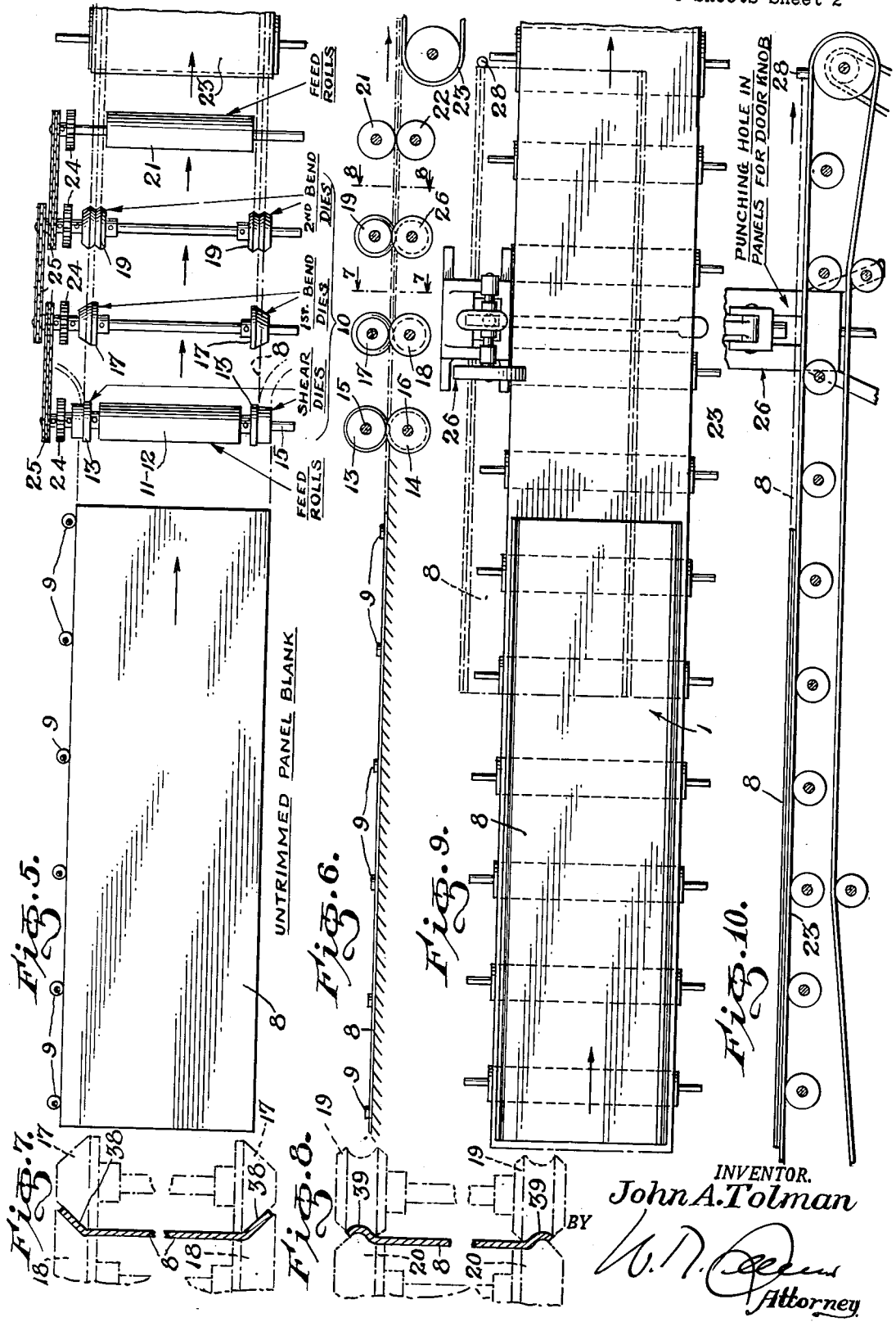

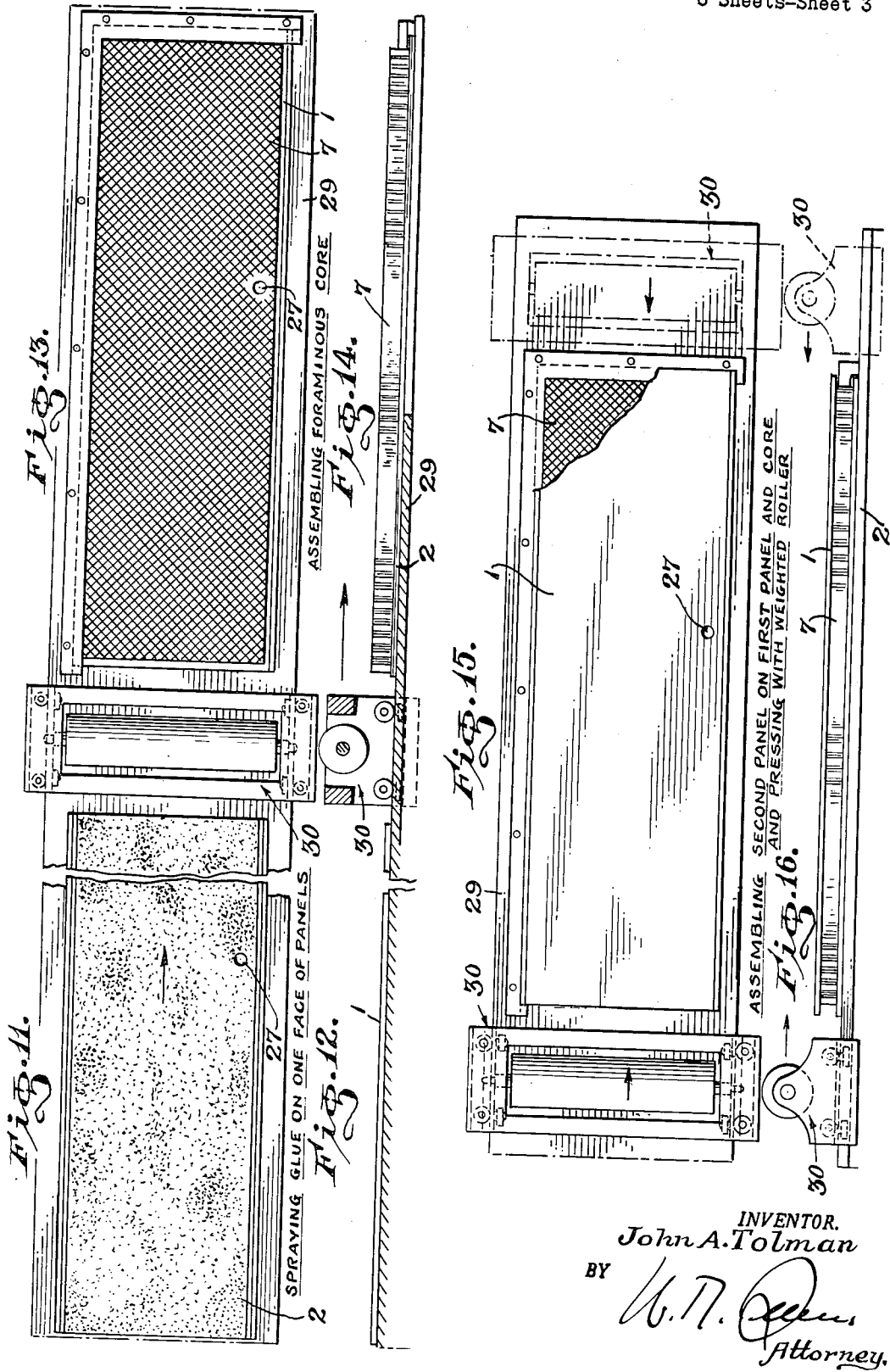

July 3, 1956  J. A. TOLMAN  2,752,672
PROCESS OF MAKING BUILDING ELEMENTS
Filed Aug. 30, 1951  6 Sheets-Sheet 4
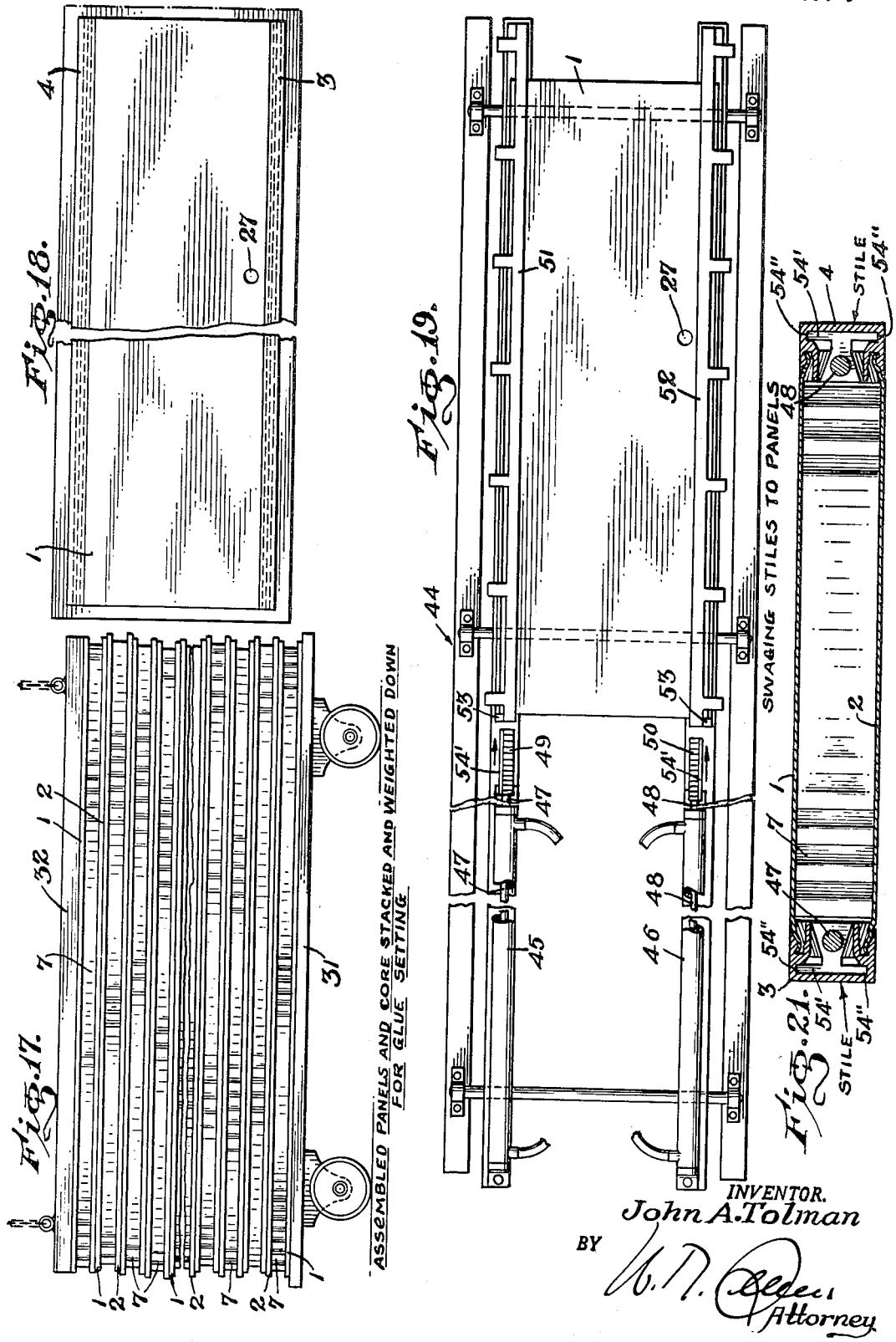
INVENTOR.
John A. Tolman
BY
Attorney July 3, 1956 J. A. TOLMAN 2,752,672
PROCESS OF MAKING BUILDING ELEMENTS
Filed Aug. 30, 1951 6 Sheets-Sheet 5
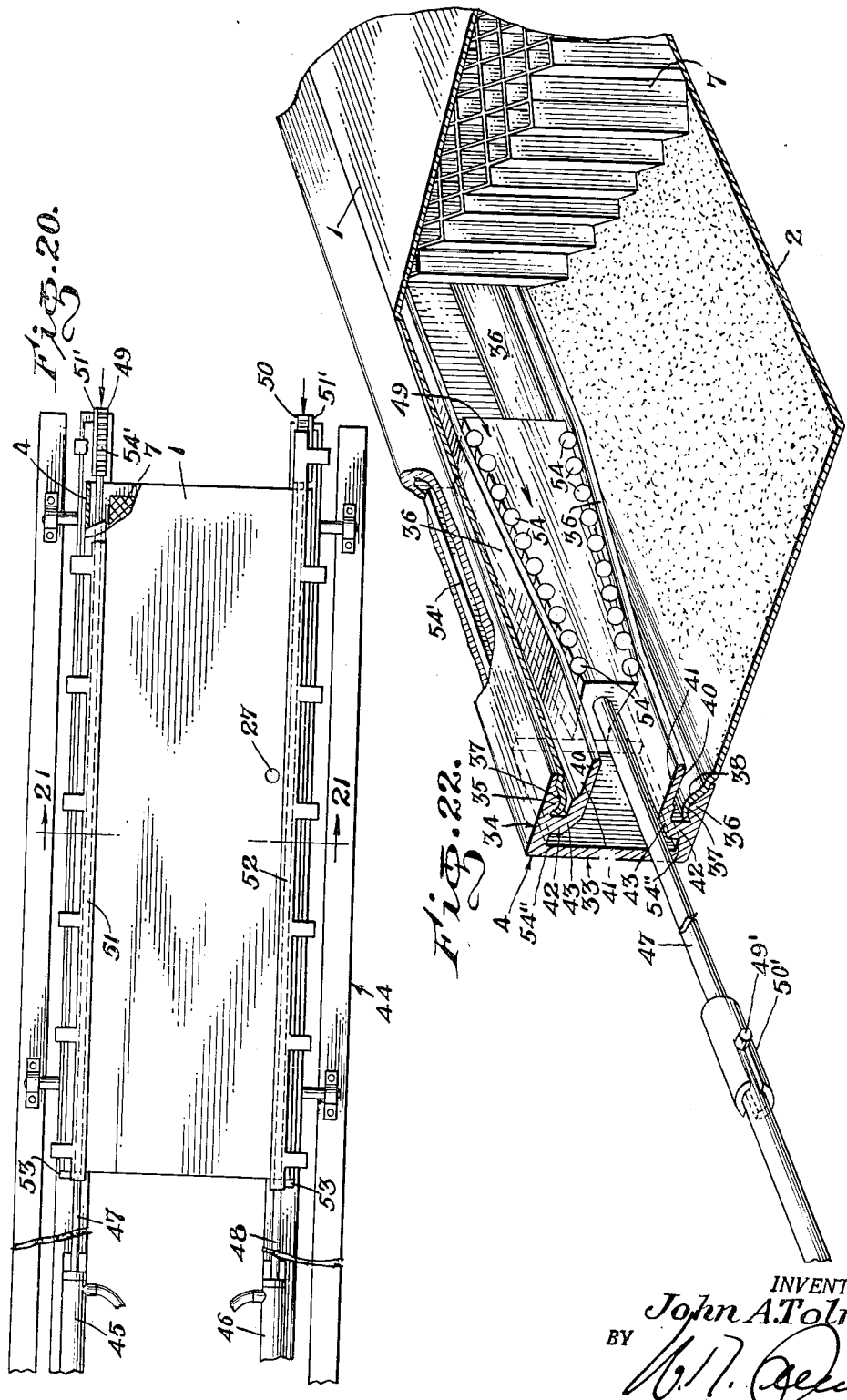
INVENTOR.
John A. Tolman
BY
Attorney.

July 3, 1956
J. A. TOLMAN
2,752,672
PROCESS OF MAKING BUILDING ELEMENTS
Filed Aug. 30, 1951
6 Sheets-Sheet 6
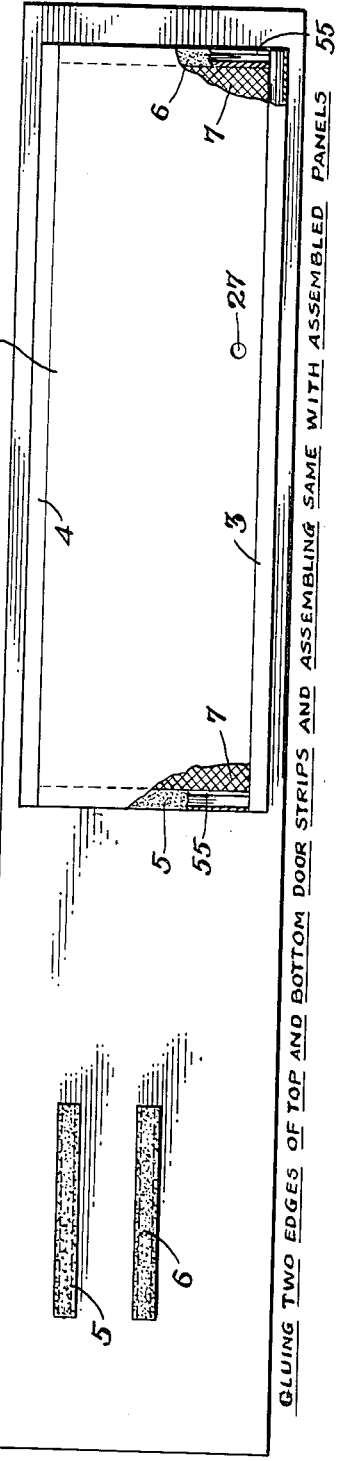
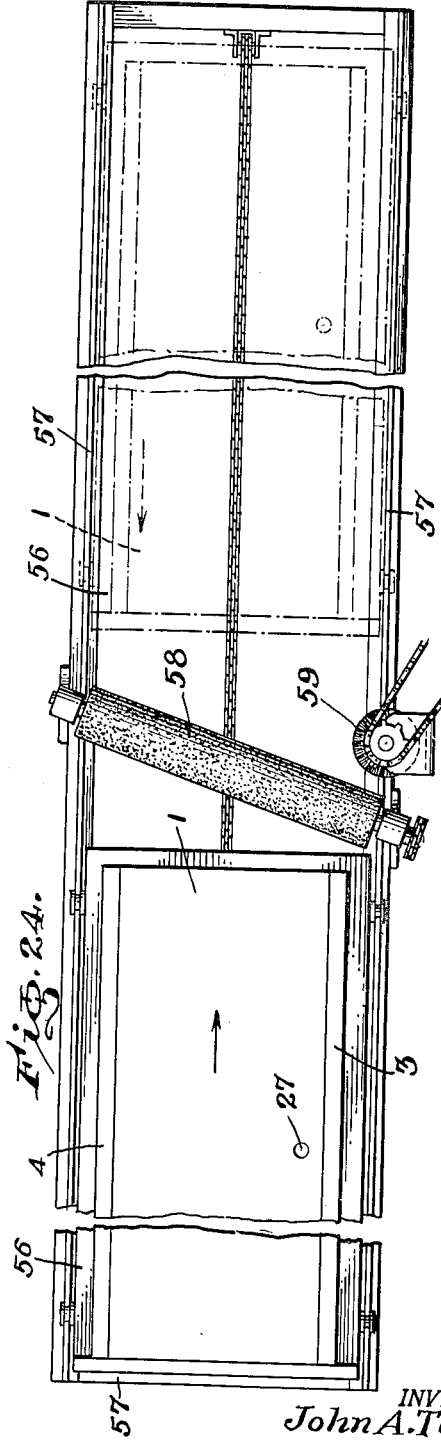
INVENTOR.
John A. Tolman
BY
Attorney.

United States Patent Office 2,752,672
Patented July 3, 1956

2,752,672
PROCESS OF MAKING BUILDING ELEMENTS

John A. Tolman, Hollywood, Calif., assignor to Andean Corporation, Pasadena, Calif., a corporation of California Application August 30, 1951, Serial No. 244,415

6 Claims. (Cl. 29—455)

This invention relates generally to the art of metal working and more particularly to a method for fabricating structural panel units and doors in a continuous process. In my prior application, Serial No. 223,728, filed April 30, 1951, there is described and claimed a novel metal door structure, and the object of the present invention is to provide a method by means of which the door structure of the type described and claimed in said prior application or similarly constructed panel units may be made in a continuous process with the resultant economies to be realized therefrom. The economic and structural advantages of said door are fully disclosed in said prior application and the present invention is concerned with additional advantages to be realized by the practice of a particular method of manufacture of said door and of similarly constructed panel units.

With the foregoing object in view, together with such additional objects and advantages as may subsequently appear, the invention resides in the provision of a method comprising a succession of steps and the provision of specific materials to be subjected to one or more of such steps in the manner disclosed, by way of example, in the following specification, reference being had to the accompanying illustrative drawings which form a part of said specification and in which drawings:

Figure 1 is a side elevation of a door to be manufactured by the method of this application, a portion of the outer panel being broken away to disclose interior construction;

Figures 2 and 3 are enlarged fragmentary sectional views taken on the lines 2—2 and 3—3, respectively, of Figure 1 and showing particularly the construction at the end and side edges of the door;

Figure 3a is a view of a portion of Figure 3 showing the side stile and panel edges positioned for swaging;

Figure 4 is a flow sheet diagram showing the succession of steps in the practice of the method;

Figure 5 is a top plan view showing diagrammatically the execution of the first operation in the method;

Figure 6 is a side elevation of Figure 5;

Figures 7 and 8 are enlarged, fragmentary, transverse views taken on the lines 7—7 and 8—8, respectively, of Figure 6 showing the forming of the edges of the panels by the forming rollers;

Figure 9 is a diagrammatic top plan view of the execution of the next operation in the method;

Figure 10 is a side elevation of Figure 9;

Figures 11 and 12 are top plan and side elevations, respectively, of a diagrammatic representation of two of the operations designated as operations 3 and 5 on the flow sheet of Figure 4;

Figures 13 and 14 are top plan and side elevations, respectively, of the step indicated as operation 4 on the flow sheet of Figure 4;

Figures 15 and 16 are top plan and side elevations, respectively, showing the execution of the step indicated as operation 6 on the flow sheet of Figure 4, a portion of the uppermost panel being broken away in Figure 15 for clearness of illustration;

Figure 17 is a side elevation illustrating diagrammatically the execution of the step indicated as operation 7 in the flow sheet of Figure 4;

Figure 18 is a diagrammatic top plan representation of the step indicated as operation 8 on the flow sheet of Figure 4;

Figure 19 is a diagrammatic representation of a portion of the execution of the step indicated as operation 9 in the flow sheet of Figure 4;

Figure 20 is a diagrammatic representation of another portion of the execution of operation 9;

Figure 21 is an enlarged transverse sectional view taken on the line 21—21 of Figure 20;

Figure 22 is an enlarged perspective, fragmentary view showing in detail the execution of the swaging operation of operation 9;

Figure 23 is a top plan representation of the step indicated as operation 10 of the flow sheet of Figure 4; and Figure 24 is a top plan representation of the final step of the method and indicated as Figure 11 in the flow sheet of Figure 4.

In the following specification and in the claims the term "panel unit" will be employed to designate completed structural units which may be either doors or panels to be installed as partition elements, the principal difference between a door and a "panel unit" being the provision of openings for a lock in the side elements of the door, said side elements being hereinafter referred to as "sheets" or "panels." Thus, while the drawings of the following specification show the steps of manufacturing a door, it will be appreciated that the omission of the step of forming lock-receiving holes will result in the production of a "panel unit" adapted for use in the erection of a wall or partition.

Referring to the drawings, and particularly to Figures 1, 2 and 3, the door comprises two identical but oppositely formed side panels 1 and 2 formed of sheet metal and held in spaced parallel relation by side stiles 3 and 4, and top and bottom end members 5 and 6, and which enclose between the panels a foraminous core 7. The details of the construction are fully set forth in my said prior application and need not be further referred to here except as such details may serve to provide a better understanding of the invention as hereinafter related.

Referring next to Figures 5 to 24, in the execution of the method the side panel blanks 8 are first cut to length from the sheet metal material which is generally in the form of rolls of a width slightly wider than the desired width of the blank. The blanks are then fed into a trimming and edge forming means along a path defined by guide rollers 9 which engage one side edge of the blanks. The trimming and edge forming means 10 comprises a pair of driven feed rolls 11 and 12 of less width than the blanks and having shear die rollers 13 and 14 at each end of the feed rolls and mounted on the same shafts 15 and 16 on which the feed rolls are mounted and which trim the side edges of the blanks to the exact width desired and in exact parallelism with each other. Adjacent to the feed rolls and trimming dies, the blank then passes through a pair of forming die rollers 17 and 18 which turn the side edges of the blank upwardly slightly, as shown in Figure 7, and then through a second pair of forming die rollers 19 and 20 which bend the edges downwardly along a line spaced inwardly from the line of bending of the first bending rollers, giving each edge of the blank a shallow U-shaped form such as shown in Figure 8. As the blanks leave the second pair of forming rollers they are gripped by a second pair of feed rollers 21 and 22 which deliver the blank to a conveyor 23 which carries the blanks to the site of the next operation. All of the preceding rollers are preferably operated from a common drive means, indicated by the chain and sprocket drive 24 and gears 25, which connect the rollers of each pair for movement in unison. The conveyor 23 carries the formed blanks to a punchpress 26 disposed at one side of the path of the blanks which pierces the holes 27 for the lock to be used with the door, the punch press being provided with locating means 28 to position the blank for punching. The above described forming and punching operations form the blanks 8 into the side panels 1 and 2 for the door and they will hereinafter be referred to as "sheets" or "panels," it being understood that if the resulting product is to be a "panel unit," the punching operation would be omitted.

Following the punching operation the inner faces of the panels are sprayed with an adhesive (see Figure 11) and one panel is laid in a locating fixture 29 with the adhesive side uppermost, and a foraminous core element 7 is placed thereon; the fixture having means to locate the core with the edges thereof spaced inwardly from the edges of the panel. The roll stand 30 is then moved back and forth over the assembled core and panel, pressing the core firmly into the adhesive. Then the other panel, which has had the inner face thereof similarly sprayed or otherwise coated with adhesive, is placed on the upper face of the core, and the roll stand 30 passed back and forth again over the assembly to firmly press the upper panel against the core.

Following this step a plurality of assembled panel and core units are stacked on a truck 31 and a heavy weight 32, such as a slab of steel or the like, is placed on the stack to maintain the pressure on the units while the adhesive is drying. The adhesive may be of a type that is air-drying and is resistant to humidity, and which further forms a satisfactory bond with the metallic surfaces of the panels as well as with the core element.

The next step in the process is the assembly of the side stiles 3 and 4 to the assembled panels and core. The stiles are formed from lengths of extruded malleable metal bar of generally U-shaped configuration cut to the length of the door with the leg portions thereof each being bifurcated. As best shown in Figures 3a and 22, each stile comprises a face portion 33 having generally parallel bifurcated leg portions 34 projecting therefrom, each comprising an outer leg 35 and a longer inner leg 36. The outer faces of the legs 35 are flush with the planes of the panel outer faces and the inner faces thereof are curved as at 37 to conform to the shallow U-shaped bends 38 and 39 formed in the edges of the panels by the rollers in the first operation. The adjacent faces 40 of the legs 36 are spaced away from the inner faces of the legs 35 to permit the formed panel edges to be sprung toward each other incident to the sidewise insertion of the stiles and passage of the curved portions 37 across the edges of the panels, the outward springing of the panel edges thereafter serving to hold the stiles in position. The opposite faces 41 of the legs 36 are generally parallel with the faces 40 except for a thickened root portion 42 adapted to resist deformation, and a slightly thinner portion 43 adjacent to the root portion 42 capable of deformation by lateral pressure against the faces 41 thereof.

Referring next to Figures 18 to 20, the panel and core assembly with the stiles snapped in place is shown in plan in Figure 18. In practice the panel and core assembly are placed on one end of an assembling and swaging means 44 having a pair of hydraulic cylinders 45 and 46 mounted at one end thereof and positioned axially in alignment with the interengaging edge portions of the stiles and panel edges. The piston rods 47 and 48 include detachable ends, connected by pin and socket connectors 49', 50', which at their own outer ends carry swaging tools 49 and 50. At the time the panel and core sandwich is placed on the swaging machine the swaging tools 49 and 50, together with the detachable ends of the piston rods, are detached from the piston rods proper. The tools 49 and 50 are positioned at one end of the stiles, the connected piston rod extensions lying within the stiles, and the stiles are then snapped into place at the sides of the sandwich, the relationship being as shown in Figure 18. The hinged leaf-clamping members 51 and 52 at each side of the assembling means 44 are then pivoted into clamping relationship, the rod extensions carrying the swaging tools 49 and 50 are connected by the pin and slot connectors to the rods proper, and hydraulic pressure is admitted to the cylinders 45 and 46 to retract the rods 47 and 48 and so draw the swaging tools through the door with resultant deformation of the inner legs 36 of the stiles to conform to the inner faces of the curved edges of the panels and consequent locking of the stiles to the panels by a joint, most clearly shown in Figure 22. The swaging tools may be of any desired form but a tool having opposed series of rollers 54 engageable with the inner faces of the stile legs 36 and having a flange element 54' engaging the grooves 54'' in the stile is preferred.

Following the above described assembly of the stiles with the panel and core assembly, the enclosure of the core within the door is completed by the assembly of the end pieces 5 and 6. The end pieces are preferably of the form best shown in Figure 2 comprising a generally rectangular hollow metal bar having one side thereof provided with a slot 55 to be exposed when the bar is used as a bottom end member for insertion of a weatherstrip. If the product is to be a panel unit or if no weatherstrip is to be employed, the end piece 6 may be installed with the slot 55 at the inner face. In this operation the side faces of the end members are coated with adhesive and the members are then pressed into place at the ends of the assembly, as shown in Figures 2 and 23, completing the assembly of the door or panel unit.

The final operation is the surface finishing of the product to remove any scratches that may have occurred in the previous operations and to provide a dull, or satin-like surface, thereto. This operation may be conveniently performed, as shown in Figure 24, by placing the assembly on a carriage 56 mounted to be moved back and forth on tracks 57 beneath an angularly disposed rotating wire brush 58 and past a vertically disposed rotating edge-engaging wire brush 59. When one side and one edge of the assembly have been thus surface-finished it is turned over and the other side and edge are similarly finished. Since the ends are not exposed to view the above surface-finishing may be omitted from them.

From the foregoing description of the improved method it will be appreciated that the steps or operations are such that little skill is required to perform any one of them and that the product resulting therefrom will be of high and uniform quality with a most economical production cost. Furthermore, the special equipment where required is simple in design and operation as well as efficient for its intended purpose.

While I have described and illustrated a specific method comprising a series of operations for the manufacture of doors and panel units, such disclosure is by way of example only and the invention is not to be deemed to be limited to the disclosure but it is intended to embrace all such modifications in the steps and in the order of succession thereof as shall come within the purview of the appended claims.

I claim:

1. A method of manufacturing a sandwich panel unit for building construction, which comprises providing a pair of metal face sheets and a core, bonding said face sheets to opposite sides of said core and with the side edges of said face sheets extending beyond the corresponding edges of said core, providing a pair of metal stiles each having two bifurcated side walls and fitting said stiles over said side edges of said face sheets, the relationship being such that the exterior and interior bifurcations of each of said stile side walls enclose a single face sheet side edge, and expanding said interior bifurcations outwardly to lock the enclosed face sheet side edges against said exterior bifurcations without changing the external shape or configuration of said stiles.

2. A method of manufacturing a sandwich panel unit for building construction, which comprises providing a pair of rectangular metal face sheets and a foraminous core, cementing said face sheets to opposite sides of said core and with the side edges of said face sheets extending beyond the corresponding edges of said core, providing a pair of channel-shaped metal stiles each having two bifurcated side flanges and fitting said stiles over said side edges of said face sheets, the relationship being such that the exterior and interior bifurcations of each of said stile side flanges straddle a single face sheet side edge, and moving a swaging tool longitudinally of each of said stiles and between said interior bifurcations to bend the latter outwardly against said exterior bifurcations and thus mechanically lock said face sheet side edges in position without changing the external shape or configuration of said stiles.

3. The method as claimed in claim 2, wherein said side edges of said face sheets are formed to provide longitudinal grooves and the interior faces of the bifurcations of each of said stile side flanges are contoured to conform to said grooves to increase the locking action created by said swaging step.

4. A method of manufacturing a sandwich panel unit for building construction, which comprises providing a pair of rectangular metal face sheets and a foraminous core, cementing said face sheets to opposite sides of said core and with the side edges of said face sheets extending beyond the corresponding edges of said core, providing a pair of channel-shaped metal stiles each having two bifurcated side flanges and fitting said stiles over said side edges of said face sheets, the relationship being such that the exterior and interior bifurcations of each of said stile side flanges straddle a single face sheet side edge, moving a swaging tool longitudinally of each of said stiles and between said interior bifurcations to bend the latter outwardly against said exterior bifurcations and thus mechanically lock said face sheet side edges in position, and providing end members at the end edges of said face sheets to effect the sealed enclosure of said core within the chamber defined by said face sheets, stiles and end members.

5. A method of manufacturing a sandwich panel unit for building construction, which comprises providing a core of predetermined thickness, providing a pair of metal face sheets and bonding the same to opposite sides of said core, the relative sizes of said face sheets and core being such that the side edges of said face sheets overhang the corresponding edges of said core, providing a pair of metal stiles each having two side walls which are respectively bifurcated to form seats for said face sheet side edges, the spacing between said seats of each stile being less than said predetermined core thickness, fitting said stiles over said face sheet side edges so that each of said sheets receives one side edge, and expanding the interior bifurcations of said stile side walls outwardly against the exterior bifurcations thereof, whereby said face sheet side edges are locked in said seats to effect holding of said face sheets against said sides of said core and thus supplement the bond therebetween.

6. The invention as claimed in claim 5, in which said expansion step is effected by a swage moving longitudinally of each stile and between said interior bifurcations, and in which said face sheet side edges and the interior surfaces of said bifurcations are contoured to increase said locking action holding said face sheets against said core sides.

References Cited in the file of this patent

UNITED STATES PATENTS

| | | |
|---|---|---|
| 1,687,952 | Stander | Oct. 16, 1928 |
| 1,898,417 | Woehler | Feb. 21, 1933 |
| 1,958,146 | Kelley | May 8, 1934 |
| 2,142,438 | Faiveley | Jan. 3, 1939 |
| 2,266,593 | Emmons | Dec. 16, 1941 |
| 2,423,870 | Blessing | July 15, 1947 |
| 2,426,289 | Wallace | Aug. 26, 1947 |